Aug. 16, 1960  H. H. MUELLER  2,949,307
SELECTIVE RECORD LOWERING, LIFTING, AND RELEASING
MEANS FOR AUTOMATIC INTERLOCKING AND
Filed June 2, 1953  CONVENTIONAL RECORD PLAYERS
5 Sheets-Sheet 1
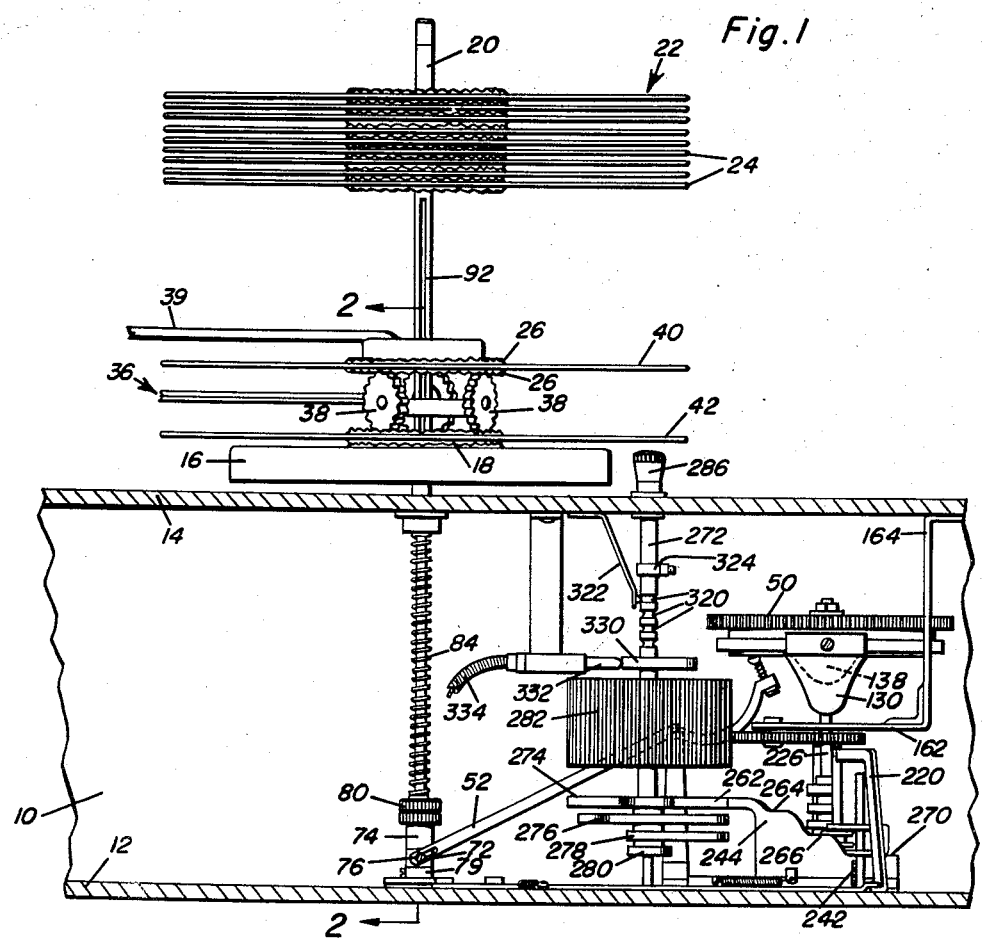
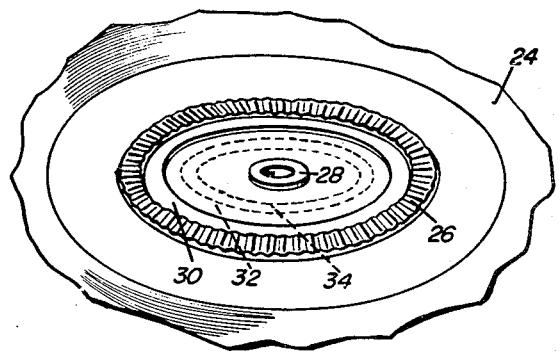
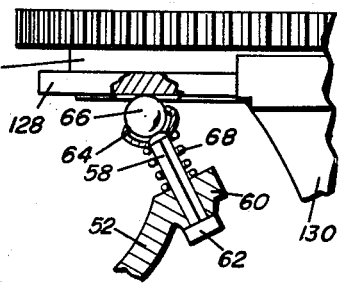
Herman H. Mueller
INVENTOR.
BY *Clarence A. O'Brien*
*and Harvey B. Jackson*
Attorneys

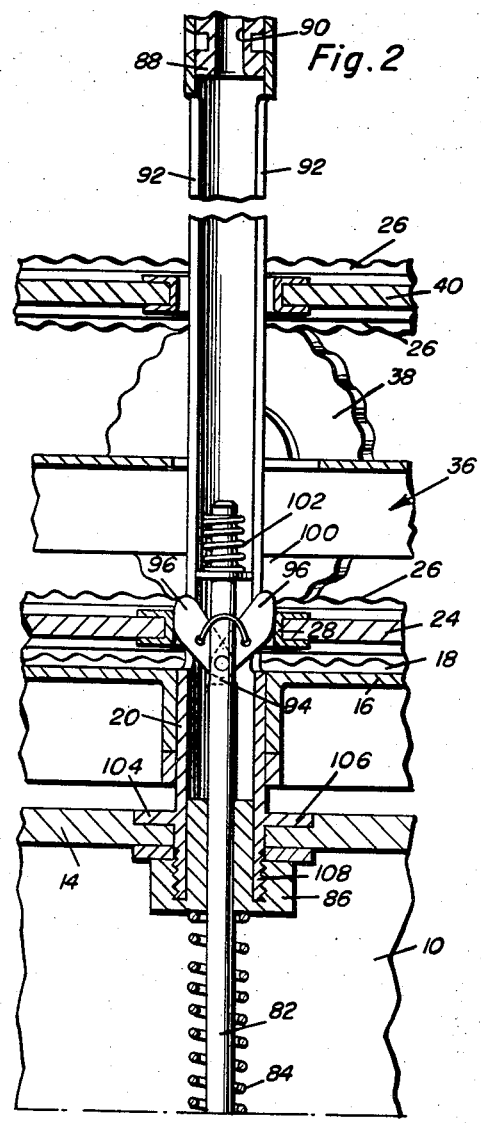

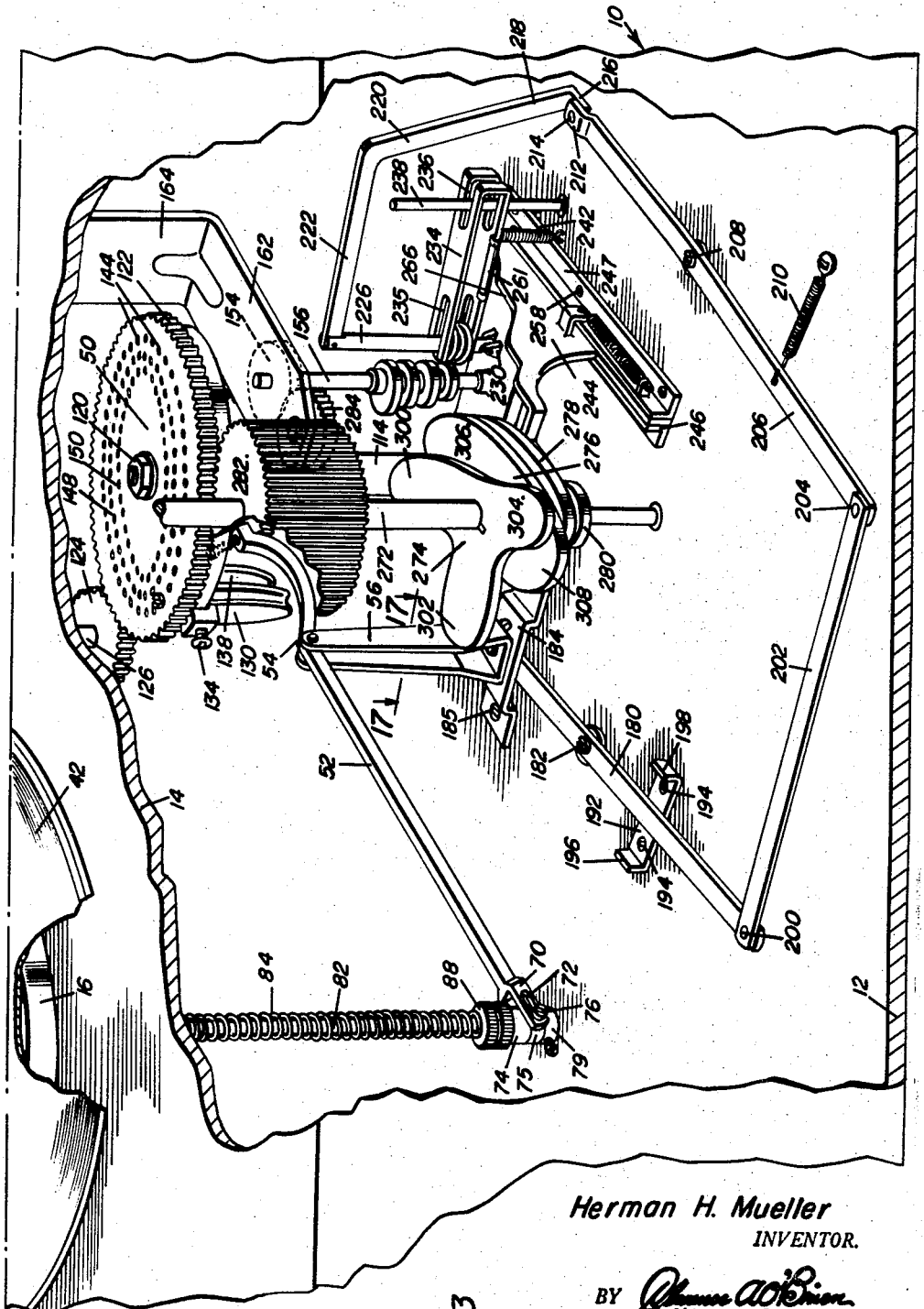

Herman H. Mueller
INVENTOR.

Aug. 16, 1960
H. H. MUELLER
2,949,307
SELECTIVE RECORD LOWERING, LIFTING, AND RELEASING
MEANS FOR AUTOMATIC INTERLOCKING AND
CONVENTIONAL RECORD PLAYERS
Filed June 2, 1953
5 Sheets-Sheet 5
Fig. 6
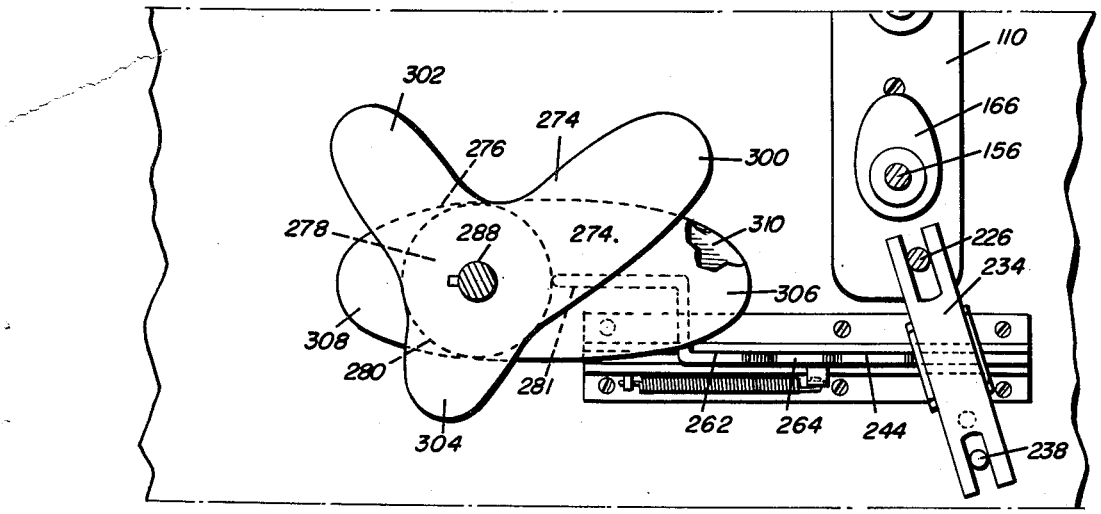
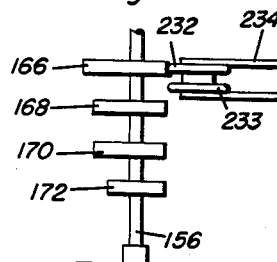 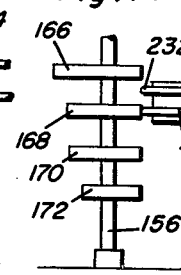 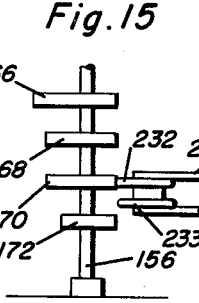 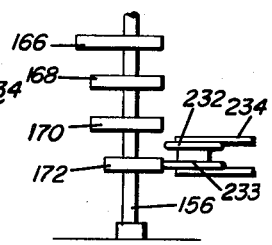
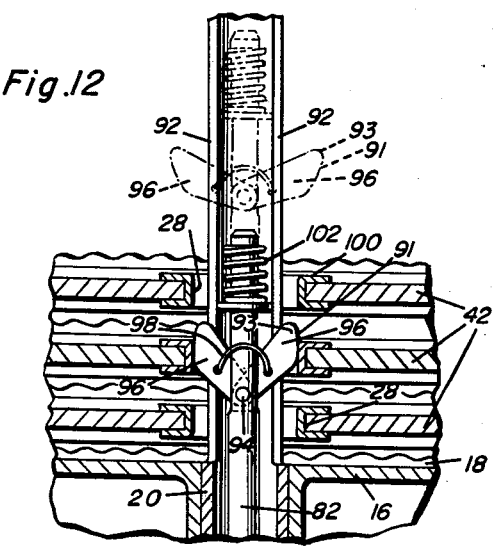
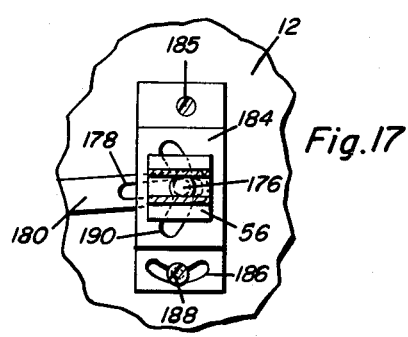
Herman H. Mueller
INVENTOR.
BY *Clarence A. O'Brien*
*and Harvey B. Jacobson*
Attorneys

United States Patent Office 2,949,307
Patented Aug. 16, 1960

2,949,307

SELECTIVE RECORD LOWERING, LIFTING, AND RELEASING MEANS FOR AUTOMATIC INTERLOCKING AND CONVENTIONAL RECORD PLAYERS

Herman H. Mueller, Ephrata, Pa.; Elizabeth M. Mentzer, executrix of the will of said Herman H. Mueller, deceased Filed June 2, 1953, Ser. No. 359,082

28 Claims. (Cl. 274—10)

This invention comprises novel and useful improvements in a selective record lowering, lifting and releasing means for automatic interlocking and conventional record players and comprises improvements over my co-pending application Serial No. 318,365, filed November 3, 1952, for Record Lowering, Lifting and Releasing Means for Automatic Interlocking and Conventional Record Players, now granted as Patent No. 2,809,840 on October 15, 1957, and constitutes a continuation-in-part of that application.

The primary objects of this invention are to provide an automatic phonograph record player wherein an interlocking non-slipping operative engagement is effected between the record and the turntable for insuring a constant speed of rotation of the record and for obtaining perfect fidelity of tonal reproduction; wherein both sides of a record may be played in succession while the record remains in a horizontal position about its spindle; wherein a stack of records may be played in various selected sequences in a fully automatic manner; wherein a stack of intermixed records of different standard sizes may be played in various selected sequences in a fully automatic manner; and wherein a record may be released from a stack and gently lowered to a playing position and/or to the turntable in contrast to the conventional manner of releasing and dropping such record.

A further important object of the invention is to provide a mechanism for gently releasing and lowering records from a stack to different positions for playing the same and to a turntable and wherein the operation of said mechanism may be readily adjusted to conform to various different positions for the playing of records.

Another important object of the invention resides in the provision of mechanism whereby means is provided for releasing and gently lowering records from a stack or position of support to a lower playing position; and whereby the amount of stroke of such lowering means may be readily varied in accordance with the positions between which the record to be lowered is to be moved.

An additional object is to provide a mechanism as set forth in the preceding object wherein a single operating cam member imparts varying strokes to a single actuating lever which is at all times in direct positive engagement with a record lowering means; and wherein a series of control cams vary the stroke imparted to the actuating lever by the single cam member.

Yet another important purpose of the invention is to provide a record releasing and lowering mechanism in accordance with many of the foregoing objects, wherein the mechanism shall be synchronized with the record playing mechanism for any of the automatic playing positions of the latter; and may be selectively adjusted to permit manual changing and playing of records by the record player.

A still further aim of the invention is to provide a record releasing and lowering mechanism as set forth in any of the above objects of the invention, wherein a cushioning action is effected for said mechanism.

Yet another purpose of this invention is to provide an interconnection between the mechanism selecting and controlling the sequence of operations of a record releasing, lifting and lowering mechanism and a tone arm support adjustable to different playing positions for synchronizing operation of the same.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in vertical section through a portion of a phonograph record player embodying therein the selective record lowering, lifting and releasing means of this invention, the record driving and supporting mechanism being shown in one of its positions of operation, the tone arm being omitted from this view;

Figure 2 is a fragmentary vertical sectional view taken upon an enlarged scale substantially upon the plane indicated by the section line 2—2 of Figure 1, parts being broken away and shows structural details of the record releasing, lowering and lifting means;

Figure 3 is a diagrammatic perspective view showing the structure of the operating mechanism of the record lowering and releasing means of this invention;

Figure 6 is a fragmentary horizontal plan view of a portion of the control means for the selective record lowering and releasing mechanism;

Figure 7 is a fragmentary detail view in elevation and section of a portion of the cam and follower of Figure 1, upon an enlarged scale, and showing in particular the cushioning means;

Figure 8 is a fragmentary plan view upon an enlarged scale of one of the interlocking record disks with which this invention is intended to operate;

Figures 9–11 are diagrammatic views, partly in elevation and partly in section, showing the different positions of the tone arm for selectively playing records in different manners and for which the selective lowering and releasing means of this invention is particularly adapted;

Figure 12 is a detail view of a portion of the mechanism shown in Figure 2 but illustrating the parts in a different position during operation of the record lowering, lifting, and releasing means;

Figures 13–16 are diagrammatic views showing the cam follower and shifter in different positions relative to the control cam; and Figure 17 is a fragmentary horizontal sectional view, taken substantially upon the plane of the section line 17—17 of Figure 3, and showing the adjustable mounting of the fulcrum support for the lift lever.

Figure 4:
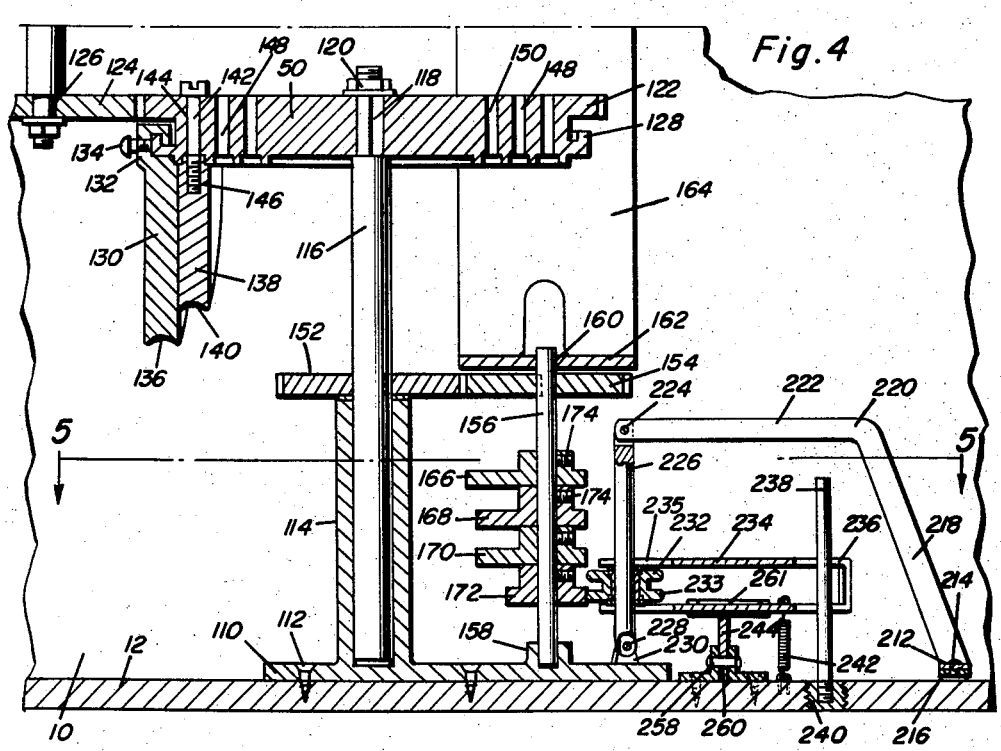
Figure 4 is a fragmentary vertical transverse sectional view through a portion of the operating mechanism of Figure 3, showing further details of structure and arrangement, being taken substantially upon the plane of the section line 4—4 of Figure 5.
Figure 5:
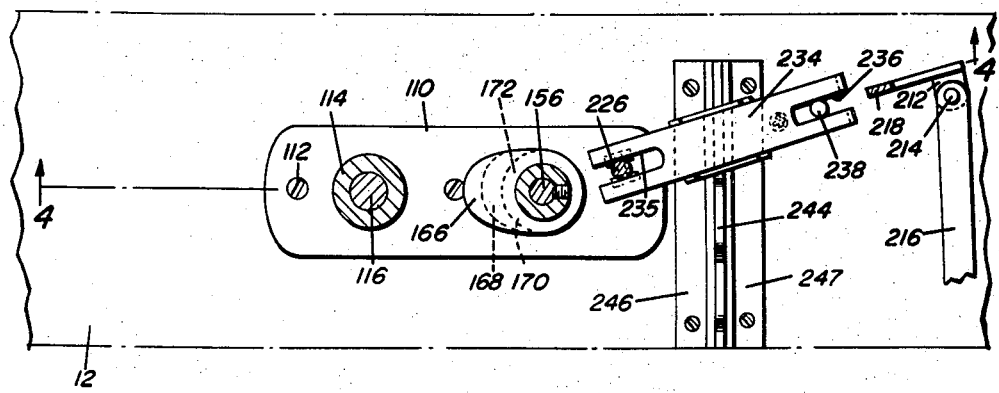
Figure 5 is a horizontal sectional view taken substantially upon the plane indicated by the section line 5—5 of Figure 4.

Indicated generally by the numeral 10 is the casing or cabinet of the phonograph record player, the same including a bottom wall 12 and a top wall 14. Suitably mounted upon the top wall 14 is a variable speed turntable 16 and while the same may be of any desired type, it is preferred to form the same of the interlocking type and of the construction set forth in my co-pending application Serial No. 296,382, now Patent No. 2,809,843, granted on October 15, 1957, this turntable having an interlocking ring 18 upon its top surface for interlockingly engaging the complementary interlocking ring of a record or stack of records thereon; or a record supporting and driving means to be set forth hereinafter.

The record player further includes the usual vertical spindle 20 which is secured to the top wall 14 of the cabinet and rises vertically thereabove and through the turntable, and the spindle is adapted to support a stack of records indicated generally by the numeral 22 in an elevated position thereon. While these records may be of any conventional type, it is preferred to form the same of the interlocking non-slipping type disclosed in my co-pending applications Serial Nos. 296,383, and 324,993, filed June 30, 1952, and December 9, 1952, respectively, now Patents 2,776,837 and 2,776,838 both granted on January 8, 1957; and in my prior Patent No. 2,559,786 of July 10, 1951.

As will be better understood from Figure 8, each of the records 24 has an interlocking ring 26 upon both of its faces and within the sound track of the record. This interlocking ring is adapted to engage with the interlocking ring 18 of the turntable, or interlocking rings of adjacent records, or with a supporting driving assembly to be set forth hereinafter whereby the record will have a positive interlocking and non-slipping engagement therewith.

A reinforcing bushing 28 of any suitable material is disposed in the spindle aperture of the record, as shown clearly in Figure 2, to reinforce the rim of this opening and to prevent excessive wear at this point.

Disposed between the reinforcing bushing 28 and interlocking ring 26, are a plurality of speed control rings 30, 32, and 34, disposed at different concentric positions between the bushing and the interlocking ring. These rings, only one of which is employed upon each record, serve to operate mechanism which adjusts the speed of the turntable and adjusts the needle assembly for playing the particular record to which the ring is attached at the proper speed and with the proper needle for that record, all as set forth in my co-pending application Serial No. 347,507, filed April 8, 1953, for Automatic Speed and Needle Changer Control for Playing Interlocking Records.

There is also provided a record supporting and driving assembly indicated generally by the numeral 36 and which includes a plurality of peripherally toothed rollers 38 thereon. As will be readily apparent from Figures 1 and 2 in particular, and from the diagrammatic views of Figures 9, 10, these rollers are adapted to support upon their top surfaces a record 40 which has been lowered from the stack 22 whereby the interlocking ring of the bottom surface of the record 40 will rest upon the rollers and have a positive non-slipping driven engagement with the same. The rollers themselves are adapted to rest upon the interlocking rings 18 and 26 of the turntable or of a record or the topmost record 42 of a stack of records which are placed upon the turntable in interlocking engagement therewith.

This supporting and driving assembly has been set forth in detail or claimed in my prior Patents No. 2,729,455 and 2,809,840 and in my co-pending applications Serial Nos. 367,316 and 347,507.

It will thus be apparent that by means of the supporting and driving assembly 36, a record 40 is held above the turntable in spaced relation thereto or to the stack of records carried by the turntable, but is rotated and driven thereby whereby this supporting record may be played upon its top side or bottom side as set forth hereinafter.

The record player to which the present invention pertains also includes a tone arm, a portion of which is indicated at 43, see Figures 9-11, and which has a head 44 thereon having upwardly and downwardly extending needles or styluses 46 and 48 respectively. The tone arm, and the needle or stylus assembly therefor is preferably of the construction disclosed or claimed in my co-pending applications which have now matured into Patents No. 2,809,841 and 2,809,842 of October 15, 1957, and Serial No. 347,507, filed April 8, 1953, for Automatic Speed and Needle Changer Control for Playing Interlocking Records.

At this point it should be understood that the term needle or stylus is used in this application in its broadest sense, and is understood to cover any sound reproducing means. Thus, the term may include the use of a conventional tone arm pickup needle; a magnetic pickup for reproducing the sound when the latter has been impressed upon the record in a magnetic manner; a photo-electric cell pickup and the like. The record player additionally includes a pressure arm assembly 39, which may be of any of the types and constructions disclosed in my prior Patent No. 2,729,455 and in my co-pending applications Serial Numbers 347,507 and 367,316.

The record player also includes numerous other sub-assemblies and organisms which control the rotation at various speeds of the turntable; which properly time and correlate the various sequences of operations performed by the automatic record player; together with a manual control whereby the record player may be caused to perform in various fully automatic manners in a variety of sequences of playing, or may be switched to manual operation and control where desired, all of these organisms being disclosed in my various co-pending applications, or being otherwise well known in the art and forming in themselves no part of the improvement which constitutes the present invention.

A cam member 50 is provided, operated by suitable mechanism, not shown, but of any conventional design, in synchronization with the movement of the other elements of the automatic record player. The cam member in the present invention, as set forth hereinafter, is of a particular and improved construction, but performs the same general or basic functions as the cam member 34 in my prior Patent No. 2,809,840, serving to operate the record releasing, lifting, and lowering means. For this purpose, the cam periodically actuates the lift lever 52 which intermediate its extremities is journaled as at 54 upon a bracket or support 56 suitably movably mounted for adjustment within the record player cabinet. The lever 52, in turn, is operatively connected with a mechanism whereby a record is released from the stack 22 and is lowered to the record supporting and driving means, which means may be either the supporting rollers 38 or may be the interlocking ring 18 of the turntable or the interlocking ring 26 of the topmost record resting upon the turntable.

Referring now more specifically to Figure 7, it will be seen that the lever 52 is downwardly curved or bowed at the end adjacent the cam member 50, and has a yielding or cushioned engagement with the cam member 50, by means of a resilient antifriction cam follower interposed therebetween. This cam follower preferably consists of a plunger 58 which is slidable through an apertured boss 60 on one extremity of the lever 52, and which plunger is provided with a head 62 which limits movement of the plunger towards the cam member 50. At the other extremity from the head, the plunger 58 is provided with a cup 64 in which is rotatably retained an antifriction ball 66 which engages with and is operated by the cam member 50. A compression spring 68 surrounds the plunger 58 and is interposed between the lever 52 and the ball retainer 64 to yieldingly urge the plunger and ball outwardly of the lever and towards the cam member.

The spring 68 is sufficiently strong so that during normal oscillation of the lever by the cam member, there will be little or no relative movement between the plunger and the lever. However, if for any reason the mechanism associated with the lever 52 encounters a predetermined resistance or obstruction to its oscillation, the spring 68 will yield and permit sliding movement of the plunger in the lever, thereby cushioning the operating mechanism associated with the lever.

At its other extremity, as shown in Figures 1, 2 and 3, the lever 52 is provided with a pair of forked arms 70 which are longitudinally slotted as at 72. A connector 74 is disposed between and is pivotally secured to the arms 70. For this purpose, there is provided a connector ring 75 which is freely oscillatably rotatable upon the connector 74, being retained thereon and restrained against sliding movement by an integral annular shoulder 77 on the connector and by a retainer ring 79 suitably secured as by a set screw. Pivot screws 76 are threaded into the connector ring 75 and are slidably mounted in the slots 72 of the lever arms 70.

The connector 74 consists of an axially bored member which is internally threaded at 78. At its upper end, it is provided with a flat annular surface adapted for engagement by a lock nut 80 which is threaded upon the lower screw threaded extremity of a rod 82 which is also threaded into the bore 78, this rod constituting an actuator for the record holding means to be subsequently described.

The actuator rod 82 extends upwardly through the hollow spindle 20 for sliding movement longitudinally thereof and a compression spring 84 surrounds the rod and at its lower end abuts against the spindle holding nut 86 and at its lower end bears against the lock or adjusting nut 80. It will thus be seen that the spring yieldingly urges the actuator rod downwardly relative to the spindle and also yieldingly urges the lever 52 into contact with the cam member 50. As will be readily understood, the force of the spring 84 is considerably less than that of the cushioning spring 68, previously mentioned.

As so far described, it will now be apparent that by releasing the screws 76, the connector 74 may be readily adjusted to thus vary the position of the actuator rod 82 with respect to the lever 52 and consequently to vary the top and bottom limits of the vertical travel of the actuator rod for a given amplitude of oscillation of the lever 52 by the cam member 50.

The above described operative connection between the lever 52 and the actuator rod 82 will thus permit a horizontal swinging of the lever about the axis of the actuator rod by means of the mounting of the ring 75 on the connector 74 for the purpose to be subsequently apparent; will allow through the pins 76 and slots 72 a limited oscillatory motion of the lever towards and from the rod on the lever swinging vertically upon its fulcrum pin 54; but will prevent sliding movement of the lever axially of the rod by virtue of the shoulder 77 and the retaining ring 79.

The record holding and releasing means, set forth in Figure 2, is generally similar to that disclosed in my prior Patent No. 2,809,840, in Figures 3–6 and 9 therein. However, a portion of that mechanism has been omitted from the showing in the present case, in the interest of simplicity of illustration and description, inasmuch as the omitted portion, in itself, forms no part of the invention claimed in the present application apart from the fact that the same is operated in a novel manner as set forth hereinafter.

The record holding and releasing means includes the hollow spindle 20, previously mentioned. Adjacent its upper end, and at a location just below the lowermost record of stack 22, as set forth and claimed in prior Patent No. 2,809,840, the spindle is provided with a pair of openings and holding members are disposed within said spindle for alternately engaging the lowermost and the next to the lowermost record of the stack of records for supporting the stack and for releasing the bottom record therefrom. A reciprocable operator is also disposed within the spindle for alternate actuation of the holding members by means of the actuating rod 82, the above mentioned openings, operator and holding members being not shown in the present case but being fully set forth in my last mentioned prior patent.

However, a guide bushing 88 is suitably secured within the spindle 20, being provided with an axial guide opening 90 into which and through which the rounded upper end of the actuating rod 82 is adapted to extend for engagement of the operator. As set forth in my last mentioned prior patent, it is only the final upward portion of the operating stroke of the actuating rod 82 which passes through the guide opening 90 that is effective to operate the holding members of the release means for releasing the lowermost record from the stack of records. This final upward movement of the rod 82 is cushioned by a compression spring 102 which surrounds the rod, resting upon a collar or integral flange 100 and is adapted to abut the lower surface of the guide bushing 80. However, there is disclosed in the present application the means for gradually lowering the released record from the stack to the record supporting and driving means, whether the latter consists of the rollers 38, the turntable 16 or the stack of records resting thereon. For this purpose, the spindle is provided with one or more longitudinally extending slots 92 which extend from immediately below the bushing 88 down to below the turntable. Pivoted to the actuator rod 82 as by a pivot pin 94 are one or more fingers or members 96, normally retained in an expanded position, as shown in Figures 2 and 12, by any suitable spring means 98, at which time these members while riding in the slots 92 will extend beyond the exterior surface of the spindle.

The spring 102 will normally tend to maintain the fingers in their extended position, until the actuating member has substantially completed its upper travel. When so extended, these fingers will engage and support the bottom side of a record for raising the same during the upward travel of the actuator rod, and upon downward travel of the actuator rod for gradually lowering the record to its next position, whether the latter be upon the supporting and driving rollers 38 or upon the turntable or the stack of records upon the turntable.

When extended, the fingers 96 will engage and support the underside of any record in proper position upon the spindle, for lifting, supporting and/or lowering such record in accordance with the movements of the actuator rod. When the latter is in its uppermost position, at the time a record is released from the stack, the released record will drop down the spindle upon the extended fingers 96. This distance of free fall of the released record is, of course, so small as to be negligible. The released record, supported by the fingers is then lowered gently to either the supporting and driving rollers 38, which have now been moved into their operative position, or to the turntable or accumulated stack of records thereon if the lowered record is to be played on the turntable or to be discarded thereon. The actuator rod and the fingers 96 then drop to their lowermost position, with the fingers descending below the turntable and the fingers being compressed or collapsed into the spindle by the engagement of the lower edges of the fingers with the bottom of the slots 92, the upper surface of the turntable or the upper surface of the topmost record on the turntable. This functioning will be apparent from a consideration of Figures 2 and 12.

The outer ends of the fingers are appropriately shaped and rounded, as in Figure 12, to enable the fingers to be retained in their collapsed position whereby they may elevated through a stack of records upon the turntable and will be prevented from laterally expanding into their open position until they have passed upwardly above the topmost record 42, of the stack. As soon as they have cleared the topmost record, the fingers will be expanded by the spring 98 and be in position to engage, support and lift and lower the next record thereabove, whether this be a record 40 on the rollers 38, as in Figure 2, or the lowest record 24 of the stack 22.

It is important to note that the rounded outer ends of the fingers 96, are appropriately proportioned and shaped to provide a guiding or camming edge or surface 91 which has a rounded nose 93. The surface 91 slides inside the reinforcing rings 28 in the spindle apertures of the stacked records 42, while the nose 93 facilitates entry of the collapsed fingers into the spindle aperture of the adjacent upper record before the cam surface 91 has left the record spindle aperture by which it is held in collapsed position. Thus, the fingers can expand into operative position only after both the portions 91 and 93 have emerged from the record spindle apertures of a plurality of stacked records.

It should be noted that adjacent its bottom end the spindle 20 is provided with an annular flange 104 which is adapted to be seated in a recess 106 in the top wall 14 of the record player cabinet, the lower portion of the spindle being externally threaded as at 108 and extending through the top wall to receive the above mentioned locking nut 86 whereby the spindle is removably clamped in a stationary position upon top of the cabinet.

Attention is now directed more specifically to Figures 3 and 4, for an exposition of the construction of the cam member 50. It will be noted that there is provided a base plate 110 which is removably secured to the cabinet bottom 12 as by means of screws 112. Rising from the base plate is a cylindrical or tubular sleeve 114 which constitutes a journal for the lower end of a vertical shaft 116 having a non-circular upper end 118 to which the cam member 50 is removably secured as by fastening nut 120. It will thus be seen that the cam member is rigidly secured to and rotates with its supporting axle or spindle, the shaft 116. Mounted upon or forming a part of the upper periphery of the cam member 50 is a ring gear 122 which is continuously in mesh with a driving gear 124 mounted upon the supporting axle 126 secured in any desired manner to the cabinet and by which motion is imparted to the cam member in properly timed relation to the operation of the other elements of the phonograph record player, by any suitable mechanism, not shown. This mechanism however could be of the type set forth in my prior Patent No. 2,729,455.

About the lower portion of its periphery, the cam member 50 is provided with a laterally extending annular channel-shaped rim or track 128 and a cam 130 is provided with a channel-shaped upper extremity 132 by which the cam is mounted and is rotatable upon the track 128. A setscrew or the like 134, constitutes means whereby the cam may be removably or releasably secured in any desired rotational position upon the cam member 50. By this means, the cam 130 may be adjusted to a position upon any part of the circumference of the cam member thereby facilitating timing of the operation of the lever 52 by this cam.

The cam 130 extends through any desired portion of the circumference of the cam member 50 and upon its cam face is provided with a groove or track 136 in which the previously mentioned roller 66 of the lever 52 is adapted to ride.

Secured to the underside of the cam member 50 is a second cam 138 disposed closely adjacent to the cam 130. This second cam likewise has a groove 140 upon its cam surface, and the cam 138 is adjusted circumferentially of the cam member 50, as by means of a fastening bolt 142 which extends through any one of a series of apertures 144 extending through the cam member 50 and into a selected one of a plurality of internally threaded bores 146 of the cam 138. By this means, by the alignment of selected bores in the cam member 50 and in the cam 138, a very fine or precise angular adjustment of the cam 138 with reference to the cam member 50 and the cam 130 can be effected.

It should be noted that the lift of the cam 130 is greater than that of the cam 138. The former is intended to impart the maximum lift to the actuator rod 82, so that the lift fingers 96 thereon will reach their maximum vertical position for receiving a record from the bottom of the stack 22 and lowering this record to the top of the supporting rollers 38, or to the turntable. The cam 138 in turn has a lift sufficient to lift the record from the top of the rollers 38 and permit the latter to be lifted and withdrawn laterally to one side of the record player, and thereafter lower the record to the turntable or the stack of records upon the turntable.

As shown in Figures 3 and 4, a further series of bores 148 and if desired 150 are provided in the cam member 50 in order to accommodate in a similar manner other cams of the same general nature and for similar purposes to the cams 130 and 138.

If desired, an annular idler or no-lift rest track may be secured to the cam member 50 inside the lift cams 130 and 138, to receive the cam follower 66 of the lift lever 52 when the latter is idle or in its lowered position.

Secured to the spindle or axle 116 of the cam member 50 is a gear 152 which is continuously in register with a gear 154 secured to a vertical axle 156 which at its lower end is rotatably journaled in a journal bushing 158 upon the base plate 110, and at its upper end extends into a guide aperture 160 formed in the horizontal arm 162 of a support bracket whose vertical arm 164 is secured in any desired manner to a portion of the cabinet 10. By this means, the axle 156 is mounted for driving in timed relation by the cam member 50 and the driving means of the same.

A plurality of control cams 166, 168, 170, and 172, are secured in vertically spaced relation to the axle 156 as by means of setscrews 174. These cams operate by means of a linkage to be now described, an adjustment for the lever 52 whereby the latter may be shifted from the cam 130 to the cam 138 or to other cams or surfaces of the cam member 50.

For this purpose, as shown in Figures 3 and 17, the support bracket 56, upon which the lift lever 52 is journaled by the fulcrum pin 54, is in turn pivotally secured as by a pivot pin 176 to an elongated slot 178 in one end of an adjusting lever 180. The latter is secured to a fulcrum pin 182 intermediate its ends, and the slotted end of the lever extends under a bracket 184. The latter has one end secured as by a screw 185 to the base or bottom wall 12 of the cabinet, and its other end is provided with an arcuate slot 186 through which extends a screw 188. By means of this latter screw the bracket may be adjusted about the fastener 185, as will be apparent, for making slight wear compensating adjustments of the fulcrum.

The mid-portion of the bracket 184 is raised or offset from its two extremities containing the openings by which the bracket is fastened to the floor 12 of the cabinet by the screws 185 and 188. This mid-portion is likewise provided with an arcuately extending slot 190 through which the pivot 176 of the support bracket 56 extends and moves. As so far described, it will now be seen as the lever 180 is oscillated about its fulcrum 182, the extremity of this lever will cause movement of the pivot 176 in the arcuate slot 190 and thereby cause an arcuate movement of the support 56 of the lever 52. This arcuate movement is, of course, permitted by the elongated slot 178 and the arcuate slot 190 through which the pivot 176 extends.

Since one end of the lever 52 is secured to the vertical axis of the actuating rod 82, the entire lever 52 will pivot about the axis of the actuating rod. The other end of the lever, carrying the plunger 58 and the cam follower 66 will, of course, describe an arc about the vertical axis of the actuating rod 82, thereby causing the follower 66 to be selectively positioned upon one of the series of cams 130, 138, and so forth, with which the cam member 50 is provided.

The opposite end of the actuating lever 180 slides across a supporting plate 192 which is secured to the bottom 12, as by fastening screws 194. Rising from the plate 192, as from its opposite ends, are a pair of stop members 196 and 198 which limits movement of lever 180 about its pivot 182 and thus limit travel of the cam follower ball 66 across the various cams of cam member 50.

The other end of the lever 180, is pivoted as at 200, to one end of a link 202 whose other extremity is pivoted as at 204, to a further lever 206 which is centrally fulcrumed as at 208. A spring 210 suitably secured to the bottom 12 of the cabinet yieldingly urges the lever 206 and consequently the lever 180 in a counter-clockwise direction about their fulcrums 208 and 182, as viewed in Figure 3.

The curved or bowed end of the lift lever 52 provides a clearance for the high lift cam 130 and the low lift cam 138 when the cam follower 66 of the lift lever bears upon the surface of the cam member 50.

Referring now more particularly to Figures 3 and 4, it will be seen that the end of the lever 206 opposite the pivot 204 has a laterally offset extremity 212 which is pivotally connected, as at 214, to the angulated end portion 216 at the lower end of an arm 218 of a bent link 220 whose other arm 222 is pivoted at 224 to the upper end of a shaft 226. The latter, at its lower end is pivoted, as at 228, to an upstanding lug 230 likewise rising from the base plate 110. The rod 226 is disposed closely adjacent to the axle 156 and by the above mentioned linkage may be pivoted towards and from this axle for a purpose to be now set forth.

Freely rotatable upon the rod 226 and slidable axially thereof is a cam follower having an integral, spaced pair of rollers 232 and 233, which are adapted to be moved axially or vertically along the rod 226 for operating engagement with selected ones of the cams 166, 168, 170, and 172. Such vertical or axial movement is controlled by the shifter or shifter yoke 234, one end of which is slotted at 235 and straddles or embraces the rollers 232 and 233 and which also is slidable axially upon the rod 226. The other end of this shifter 234, is slotted or bifurcated at 236, to slidingly embrace a vertical guide post 238 which is screw threaded at its lower extremity into a plug 240 suitably secured in the floor 12 of the cabinet. A tension spring 242 yieldingly urges the shifter 234 and the cam followers 232 and 233, into their lowermost position.

In order to selectively elevate the shifter and the cam followers along the rod 226 into selective engagement with one of the control cams on the shaft 156, there is provided a stepped cam wedge 244 having its lower end slidably received in a guiding slot or channel formed between a pair of parallel angle iron guide members 246 and 247 secured to the floor 12.

A retaining pin 258 extends between the angle iron guides and is slidably received in an elongated slot 260 in the wedge whereby to retain the latter between the guides in operative relation thereto. Journaled in the bottom surface of the shifter 234 and projecting therefrom is a roller 261 which cooperates with the operative surfaces of the cam wedge 244.

The top surface of this cam wedge is provided with a plurality of vertically spaced and longitudinally spaced cam surfaces or steps, see Figure 1, 262, 264, 266, and 270, the latter being the lowest step of the series.

The vertical height of the four steps 262, 264, 266, and 270, are such that when they are disposed beneath and support the shifter 234, the cam followers 232 and 233, thereof will be respectively positioned in operative engagement with the control cams 172, 170, 168 and 166, in a particular manner to be hereinafter set forth. Since these control cams are of different size except cams 168 and 170 which may be identical, or may have a different timing or duration, it is obvious that the axle or shaft 226 carrying the rollers 232 and 233, will be given an arcuate movement about its pivot pin 228, the extent of this arcuate movement depending upon the size of the control cam with which it is engaged. This arcuate shifting movement is in turn transmitted by the angular link 220, the lever 206, the link 202, the lever 180, to the support bracket or fulcrum 56 of the actuating lever 52, and in turn will move that lever in an arc about the vertical axis of the actuating rod 82 to thereby position the cam follower 66 upon selected ones of the cams carried by the cam member 50. It will be evident that the stops 196 and 198 will limit movement of the lever 180, and consequently movement of the cam follower 66 in both directions across the cam member 50.

It is a fundamental purpose of this invention to enable the record player to be operated in a variety of different manners, each fully automatic, in addition to permitting a manual operation. Each such manner of operation of the record player requires that a particular sequence of movements be given to the cam wedge 244, in order that the necessary properly timed and controlled series of movements may be imparted to the actuator rod 82 of the record releasing, lifting, and lowering means during each playing of a record. A selector mechanism is provided for automatically imparting the proper sequence of motions of the cam followers 232, 233, upon the control cams 166, 168, 170 and 172, by appropriate shifting of the wedge 244.

The selector mechanism includes a cam shaft 272 having fixedly secured thereto a series of selector cams 274, 276, 278, 280. Each of which is adapted to engage a finger 281 on the cam wedge 244 to actuate the latter and is appropriately contoured to impart the desired series of movements to the shifter 234 and thus effect the particular sequence of motions of the record releasing, lifting, and lowering means for a given manner of operation of the record player, by a mechanism to be hereinafter set forth. The cam shaft 272 further carries a fixedly attached axially elongated, drum-shaped gear 282, which is meshed with idler gear 152 engaged with the gear 154. The upper end of the cam shaft 272, is rotatably and slidably journaled in the cabinet top wall 14 in any suitable manner, having a manual control knob 286 thereon for vertically shifting the cam shaft as set forth hereinafter, while the lower end is axially bored for guided, sliding engagement upon a stationary guide rod 288, suitably rigidly mounted upon the cabinet base 12.

The gear 282 is of sufficient axial extent to maintain operative engagement with the idler gear 152 in several vertically or axially adjusted positions of the cam shaft; but to disengage from the idler gear in a particular position of vertical or axial adjustment. It will thus be apparent that the selector cams will be automatically operated, in properly timed relation to the operation of the control cams and the other components of the record player in all but one of the positions of vertical adjustment of the cam shaft 272, these positions corresponding to the various manners of automatic operation of the record player; and may be disengaged from such automatic operation by the gear 284 for the manual operation of the record player.

It will be now seen that the various vertical or axial adjustments of the cam shaft 272, will successively position the selector cams singly in operative engagement with the laterally extending actuator flanges 281 of the cam wedge 244. Each selector cam will impart the desired series of movements to the wedge which will produce the deserved sequence of movements to the record releasing, lifting and lowering mechanism, for a particular manner of playing the records. It is of course within the scope of this invention to omit one or more of the plurality of selector cams, when it is desired to construct an apparatus which is to be operated in a lesser number of playing positions and manners than those set forth herein and illustrated in Figures 9–11.

Obviously, any suitable gear ratio between the cam shaft 272 and the cam member 50 may be employed, corresponding appropriate cam profiles being given to the cams 130, 138; the control cams 166, 168, 170, 172; and the selector cams 274, 276, 278, 280. In the apparatus illustrated, three revolution of the cam member 50 and of the control cams to each revolution of the selector cams is deemed to be appropriate. The detailed functioning of each of the selector cams is set forth hereinafter, it being noted, however, that the control cam 172 and the selector cam 280 are each circular imparting no lift or movement to their cam followers, and are employed when the record player is set for manual operation instead of for one of the several manners of automatic operation. The rest or base circle portion of the control cams 166, 168 and 170 are of the same diameter as that of the circular control cams 172, and these rest portions are in substantial vertical alignment with each other, to facilitate vertical adjustment of the cam follower rollers 232 and 233, as will be apparent from Figures 3, 4 and Figures 13–16.

The control cams, as above set forth actuate the cam followers 232, 233, to cause a pivotal or swinging movement of a variable amplitude of the shaft 226 which in turn through the associated linkage shifts the lever 52 to either the high lift cam 130, or the cam 138 or to an idler surface on the cam member 50, thereby selectively releasing a record from the stack and lowering the same; and/or lifting and lowering records from the supporting and driving rollers 38 either back to the same or to the turntable.

Reference is now made to Figures 3, 4, 13–16, for an understanding of the movements of the shifter and cam followers and their operation by the control cams. From the diagrammatic views of Figures 13–16, it will be noted that the shifter and cam followers are movable to four positions, each of which places one follower, either 232, or 233, in operative engagement with one of the four control cams.

The spacing of the two cam follower rollers 232 and 233 is less than the distance between the evenly spaced control cams, for a purpose to become subsequently apparent.

In the top position of the shifter, the upper cam follower 232 is engaged with the upper control cam 166 which has the greatest throw of any of the cams, while the lower follower 233 lies idle between the cams 166 and 168. In this position, the connecting linkage positions the lift lever 52 upon the high lift cam 130 whereby the maximum stroke will be given to the actuator rod 82 resulting in the release of a record from the stack 22 and the lowering of this record to the rollers 38 or to the turntable, depending upon the manner in which the record player is being automatically operated.

When the shifter and cam followers are moved to the position shown in Figure 14, by a slight lowering of the same from the position of Figure 13, the lower cam follower 233 is engaged with the second control cam 168, the top roller 232 lying idle between the control cam 166 and 168. The second cam 168 has a lesser throw than the upper cam 166 and functions to position the lift lever 52 upon the cam 138 of the cam member 50, resulting in sufficient movement of the actuator rod 82 to lift the record 40 from the rollers 38 and then lower the record back to the rollers 38.

When the shifter and cam followers are lowered to the position indicated in Figure 15, the top roller 323 is now engaged with the third cam 170 with the bottom roller lying idle between the cams 170 and 172. The third cam 170 has the same cam lift throw as the second cam 168 and may be identical therewith. Its functions is to lift the record from the roller 38 and lower the record to the turntable.

In the position of Figure 16, the shifter and cam follower are lowered slightly from the position of Figure 15, with the bottom roller 233 engaging the circular or bottom cam 172 and with the top roller 232 lying idle between the third and fourth cams. In this position, the connecting linkage causes the lift lever 52 to disengage from both the lift cams 130, 138, of the cam member 50 and to lie upon an idle track or position of the same, with the actuator rod 82 in its fully lowered, and rest, position.

Each selector cam causes the necessary sequence of shifting of the cam followers on the control cams to produce the requisite series of functions of the actuator rod for the playing of a record in a particular manner. When the cam wedge 244 is moved to its outermost position, as shown in Figures 1–3, the lower step or cam surface 270 will be disposed beneath the shifter roller 261 and consequently the shifter 234 and the rollers 232, 233, will be in their lowest position, as shown in Figure 16. Upon moving of the cam wedge inwardly to its next position, the cam surface 266 will engage the shifter roller 261 and elevate the shifter and cam followers to the position in Figure 15. In turn, successive inward movements of the wedges will cause the cam surfaces 264 and 262 thereof to elevate the shifter and cam followers into the positions of Figures 14 and 13 rspectively.

Reference is now made to the diagrammatic views of Figures 9–11 showing three different manners in which records may be automatically played by this phonograph record player and the three positions of the tone arm 43 for the playing of records in these manners. In Figure 9, the tone arm is disposed in the positions A and B in alternation whereby the top and bottom sides of records are played in sequence as they are supported upon the supporting rollers 38. In each of the three diagrammatic views of Figures 9–11, a pressure arm assembly 39 serves to apply pressure to a record to hold the same firmly. The pressure applied by the pressure arm assembly 39 thus serves to assure a secure, non-slipping, interlocking engagement between the turntable, the record or records carried thereon, the supporting and driving rollers 38 and the record 40 carried by these rollers. When the records are played in the manner indicated in Figure 9, that is upon both their top and lower surfaces while being driven by the supporting and driving rollers 38, it will be evident that the tone arm assembly will be positioned first above a record, as shown at A in full lines, and then below the same, as shown at B in dotted lines.

When the automatic controls are set for the phonograph record player to play the records in the manner indicated in Figure 9, each record is in turn lowered from the stack 22 to the top of the supporting rollers 38. When in this position, the tone arm moves to position A, plays the top side of the record, then is moved to the position B to play the bottom side of the record. Thereafter, the tone arm is withdrawn, the pressure arm 39 is lifted, and the record is removed from the top of the rollers, the latter are withdrawn, and the record is then deposited upon the turntable or the records stacked thereon. The rollers are then re-introduced, resting upon this played record; the record releasing and lowering means is then actuated to release the next record from the stack and lower the same to the top of the rollers 38, pressure arm 39 is then applied, and the tone arm then moved in the position of A to repeat the cycle.

In this position of playing the records, it is evident that the two different vertical movements of the actuating rod 82 of the record releasing and lowering means is necessary. The first of these movements caused by the cam 130, control cam 166 and the interposed linkage, brings the rod to the top of its stroke, causing the end of the same to enter into and pass through the guide bore 90 of the bushing 98 and operates the releasing mechanism set forth in my prior Patent No. 2,809,840, whereupon the bottom record is withdrawn from the stack and as the actuating arm 82 descends, it carries the record with it until this record is deposited upon the driving rollers 38. It will, of course, be understood that before the record is lowered to the position upon the driving rollers, the latter are moved in from the sides of the phonograph, in the manner fully set forth in my prior Patents No. 2,729,344 and 2,809,841 and in my prior applications Serial Nos. 314,987, 347,507, and 367,316.

After the top side of the record has been played, in the position A of Figure 9, the tone arm 43 is lifted and swung aside; the pressure arm 39 is lifted and withdrawn; control cam 168 moves the shifter and cam followers to the position of Figure 14 and by the associated mechanism, the lift lever 52 is placed upon the lift cam 138 and the actuator rod 82 lifts the record 40 from the rollers 38; the latter are withdrawn; the tone arm is lowered from position A to position B; the rollers 38 are returned; the record is lowered upon the rollers; the pressure arm is returned to the record; the tone arm is swung into playing position and the bottom side is played.

Upon completion of playing the record, the tone arm is withdrawn, the pressure arm is removed; the control cam 170 causes the actuator rod to lift the record from the rollers 38; the latter are withdrawn; the record is lowered to the turntable; the rollers are returned.

The foregoing completes the sequence of operations effected by the record player in playing a record automatically, in the manner indicated in Figure 9. This sequence is all automatically controlled by the action of the selector cam 274. In some instances, it may be preferred to omit the function of control cam 168, and to allow the pressure arm to remain on the record and the latter to remain on the rollers while the tone arm is moved from position A to position B, whereby the record will not be lifted from the rollers 38 until just prior to the operation of control arm 170 and the lowering of the record to the turntable. In this case, the selector cam 274 would have but two lobes, namely, a high lobe 300 to interpose the cam wedge surface 262 beneath the shifter 234 and move the latter to the position of Figure 13 whereby a record will be released from the stack and lowered to the rollers 38; and a lower lobe 304 to lift the record from the roller and lower it to the turntable, where the record is to be lifted from the rollers 38 after the top side has been played in the position A of Figure 9, and returned thereto for playing the lower side in the position B, the second lower lobe 302 is provided between the lobes 300 and 304, as in Figure 6.

It will be noted that each time the lever 52 is operated by the cam member 50, it rises to a vertical height in accordance with the particular cam member or surface which is actuating the lever at that time; and in its lowering movement is lowered until the fingers reach a position at or below the turntable.

Figure 10 discloses still another manner in which records are played automatically by the phonograph record player of this invention. The manner shown in Figure 10 is that which is specifically set forth and claimed in my prior Patents Nos. 2,729,455, 2,809,841 and in my prior applications Serial Nos. 314,987, 347,507, and 367,316. In this position, the underside of a record is played while the same is supported upon the rollers 38, and the top side of the record is played after the same has been placed upon the turntable or the stack of records accumulating upon the turntable. For this purpose, the tone arm assumes in succession the positions shown in full lines at B and C in dotted lines in Figure 10. The position B of Figure 10 is, of course, in full correspondence with the position B of Figure 9.

The playing of a record in the manner indicated in Figure 10 is as follows. The selector cam shaft 272 is axially adjusted to position the selector cam 276 in engagement with the cam wedge finger 281. The selector cam then moves the shifter 234 into the position of Figure 13 causing a record to be released from the stack and deposited upon the rollers 38 which have first been moved in and rested upon the turntable or upon any records resting thereon; the pressure arm is applied; the tone arm is positioned at B to play the underside of the record 40; the tone arm is withdrawn; the pressure arm is withdrawn; the selector cam 276 now moves the shifter 234 to engage control cam 168, as in Figure 14, and the record is lifted from the rollers 38; the latter is withdrawn; the record is lowered to the turntable; the rollers are returned; the selector cam 276 moves the shifter to the position of Figure 13 and a record is released from the stack and lowered to the rollers 38; the pressure arm is applied; the tone arm is moved into the position C and the top side of the record 42, just deposited upon the turntable at 42, is played; the tone arm is moved into position B and the underside of the last released record is played.

To perform the above function, the selector cam 276 has a high lift lobe 306 and a low lift lobe 308 to move the shifter to the position of Figure 13 and Figure 14 respectively.

Figure 11 discloses another manner for the automatic playing of records with the record player, in which records are played in the conventional manner, customary to conventional record players. In this mode of operation, records are released singly from a stack upon the upper part of a spindle and disposed upon the turntable whereby they are played upon their top sides only. The records are manually removed, turned over and repositioned in a stack upon the spindle for playing their reverse sides.

The automatic playing of the records in this conventional manner of operating a record player, is as follows. The third selector cam 278 is positioned to engage the cam wedge finger 281. The single high lift lobe 310 upon this cam positions the shifter in operative relation to the control cam 166, in the position of Figure 13, whereby a record is released and deposited upon the turntable. The pressure arm 39 is applied; the tone arm is applied, as at C in Figure 11 and the top side of the record 48, is played. The tone arm is withdrawn and the pressure arm is removed. The apparatus is then ready for repetition of the cycle of operation.

In each of the above described three methods of automatic playing in accordance with the diagrammatic views of Figures 9–11, the selector cams are driven in timed relation to the control cams and to the operation of the other elements of the record player since the gear 282 is continuously in mesh with the gearing of the record player. It is, however, also possible to operate the record player in a completely manual manner. For this purpose, the driving engagement of the selector cam shaft 272 with the driving means of the record player is interrupted by axially shifting the selector cam shaft to its uppermost position, thereby lifting the gear 282 above and out of contact with the idler gear 284 while simultaneously engaging the fourth or bottom selector cam 280 with the finger 281 of the cam wedge 244. The cam wedge and the shifter mechanism will now be in the position shown in Figures 1–3, and in the diagrammatic view of Figure 16. In this position, since the selector cam 280 is circular, the wedge will be held in its outermost position; and since the control arm 172 operatively associated therewith is also circular, the lift lever 52 will also remain in an inoperative position. Thus, no movement of the record releasing, lifting and lowering mechanism will result, and records will be placed upon the turntable and the tone arm and, if desired, the pressure arm will be applied to and removed manually from the records or the turntable.

The apparatus is manually set for playing manually or in any one of the above described three manners of automatic playing. This is done by manually vertically or axially shifting the selector cam shaft 272 by its knob 286. This shifting between the four positions of the selector cam shifts positions the appropriate selector cam for operative engagement of the cam wedge 244. As will be now apparent, each selector cam will control the extent of movement of the record release lifting and lowering mechanism and the timing of such movements with respect to the operation of the record player.

To facilitate the adjusting and to insure maintaining the selected adjustment of the selector cam shaft 272, the latter has four spaced circumferential detent grooves 320 whose spacing is equal to that of the selector cams. A spring detent 322 is suitably supported in the casing 10 and has an end resiliently engageable in the grooves 320. Thus, when the selector cam shaft is axially adjusted to position a particular selector cam in operative engagement with the cam wedge finger, the detent and groove construction will yieldingly retain such adjustment. A stop collar 324 is secured upon the selector cam shaft to limit upward movement of the same beyond the position when the detent 322 is engaged in the lowest groove 320, at which time the bottom selector cam 280 is operatively engaged with the cam wedge finger 281.

Any suitable means may be provided to facilitate and insure that when the selector cam shaft is returned from its uppermost position, at which time the gear 282 is out of mesh with the idler gear, to a lower position whereby these gears are again in mesh, that the selector cam shaft will be in proper time with the control cam shaft.

From the foregoing, it will thus be apparent that a novel and improved control of the record release and lowering means is provided whereby the top and bottom sides may be played in sequence of records carried by the supporting rollers; the underside and top sides may be played in sequence of records carried by the supporting rollers and by the turntable; the records may be played on their top sides only on the turntable, or the records may be played manually as the same are deposited upon the turntable.

In many instances and types of apparatus, it is deemed desirable to provide a synchronizing control connection between the selector cam shaft 272 and the support post for the tone arm, whereby the latter will be automatically elevated to the position A of Figure 9 when the selector cam assembly is adjusted for playing records upon their top and bottom sides while mounted upon the supporting and driving assembly 36 in the playing position of Figure 9. For that purpose, a tone arm adjusting cam 330, as shown in Figure 1, is mounted upon the selector cam shaft 272 at any convenient position, as above the drive gear 282.

A suitable guide and support bracket, carried by the top wall 14 journals a plunger or cam follower 332 which is attached to the end of a conventional actuating cable assembly 334 whose other end, not shown, is operatively connected to the tone arm support column, not shown. The positions and relationship is such that the tone arm adjusting cam 330 will operatively register with the follower or plunger 332 only when the selector cam shaft 272 is shifted to the position shown in Figure 1, at which time the selector cam 274 which controls the sequence of operation of the control cams is in operative relation to the cam wedge 244.

The actual construction of the tone arm support post and the adjusting mechanism for the same which is operated by the follower 332 and the connecting cable assembly 334 is immaterial to an understanding of the invention set forth and claimed herein, being itself fully disclosed and claimed in my above referred to copending application Serial No. 367,316.

It is to be further recognized that any other suitable means might be provided to effect adjustment of the tone arm support post in synchronized relation to operation of the selector cam assembly.

The selective control of the tone arm for playing selected records of a stack of records, as disclosed in my copending application Serial No. 314,987 may readily be incorporated into the herein disclosed apparatus, if desired.

In addition, the turntable speed control mechanism, the needle changing mechanism and the tone arm indexing or gauging mechanism of my copending application Serial Nos. 347,507 and 367,316 may be utilized in conjunction with the foregoing mechanism.

From the foregoing the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In an automatic record player having a spindle and turntable, means for supporting above said turntable a stack of records to be played and a record supporting and driving means adapted to be operatively and drivingly connected to said turntable; record lifting and lowering means disposed in said spindle and engaging a record at a location spaced from its sound track and operable to lower a record from the bottom of said stack to said record supporting and driving means and from the latter to said turntable, operating means for said lifting and lowering means and effecting operation of the latter in properly timed relation to the operation of the record player, control means operatively connected to said operating means for adjusting the action of the latter to thereby vary the range of vertical movement of the lifting and lowering means, said lifting and lowering means including a member for engaging a record at the underside thereof for supporting said record.

2. In an automatic record player having a spindle and turntable, means for supporting above said turntable a stack of records to be played and a record supporting and driving means adapted to be operatively and drivingly connected to said turntable; record lifting and lowering means disposed in said spindle and engaging a record at a location spaced from its sound track and operable to lower a record from the bottom of said stack to said record supporting and driving means and from the latter to said turntable, operating means for said lifting and lowering means and effecting operation of the latter in properly timed relation to the operation of the record player, control means operatively connected to said operating means for adjusting the action of the latter to thereby vary the range of vertical movement of the lifting and lowering means, said lifting and lowering means including a member for engaging a record at the underside thereof for supporting said record, an adjuster for regulating said control means.

3. In an automatic record player having a spindle and turntable, means for supporting above said turntable a stack of records to be played and a record supporting and driving means adapted to be operatively and drivingly connected to said turntable, movable means within said spindle for lowering a record by engagement with the underside of the latter, from the bottom of said stack to selective positions upon said supporting and driving means and said turntable, operating means for said lifting and lowering means, control means varying the operation of said operating means whereby to impart different ranges of vertical movement to said lifting and lowering means.

4. In an automatic record player having a spindle and turntable, means for supporting above said turntable a stack of records to be played and a record supporting and driving means adapted to be operatively and drivingly connected to said turntable; record lifting and lowering means engaging a record at a location spaced from its sound track and operable to lower a record from the bottom of said stack to said record supporting and driving means and from the latter to said turntable, a first means operating said lifting and lowering means to effect engagement with and supporting of the underside of and lowering of a record from said stack to said supporting and driving means and a second means operating said lifting and lowering means to effect lifting a record by engagement with its underside from said supporting and driving means and lowering it to the turntable and tone arm means for playing the opposite sides of a record when supported upon said supporting and driving means and upon said turntable.

5. The combination of claim 4 including synchronizing means effecting actuation of said second means in timed relation to said first means.

6. In an automatic record player having a spindle and turntable, means for supporting a stack of records to be played and a record supporting and driving means adapted to be operatively and drivingly connected to said turntable; record lifting and lowering means, operating means for said lifting and lowering means, control means operatively connected to said operating means for adjusting the action of the latter to thereby vary the range of movement of the lifting and lowering means, said operating means including a cam member, a lever having a first end operatively connected to said lifting and lowering means and a second end operatively connected to said cam member, a fulcrum for said lever, said control means including means for shifting said fulcrum to vary the movement imparted by said cam member to said lever.

7. The combination of claim 6 wherein said last mentioned means shifts said fulcrum to cause pivoting movement of said lever about its first end.

8. In an automatic record player having a spindle and turntable, means for supporting a stack of records to be played and a record supporting and driving means adapted to be operatively and drivingly connected to said turntable; record lifting and lowering means, operating means for said lifting and lowering means, control means operatively connected to said operating means for adjusting the action of the latter to thereby vary the range of movement of the lifting and lowering means, said operating means including a cam member, a lever having a first end operatively connected to said lifting and lowering means and a second end operatively connected to said cam member, a fulcrum for said lever, said control means including means for shifting said fulcrum to vary the movement imparted by said cam member to said lever, said cam member having a plurality of cam surfaces thereon of different lifts, said last mentioned means effecting movement of the second end of said lever between said cam surfaces.

9. In an automatic record player having a spindle and turntable, means for supporting a stack of records to be played and a record supporting and driving means adapted to be operatively and drivingly connected to said turntable; record lifting and lowering means, a first means operating said lifting and lowering means to effect lowering of a record from said stack to said supporting and driving means and a second means operating said lifting and lowering means to effect lifting a record from said supporting and driving means and lowering it to a turntable, said operating means including a cam member, a lever having a first end operatively connected to said lifting and lowering means and a second end operatively connected to said cam member, a fulcrum for said lever, said control means including means for shifting said fulcrum to vary the movement imparted by said cam member to said lever.

10. The combination of claim 9 wherein said last mentioned means shifts said fulcrum to cause pivoting movement of said lever about its first end.

11. The combination of claim 4 wherein said operating means includes a cam member, said cam member having a plurality of cam surfaces thereof of different lifts, a cam lever having a first end operatively connected to said lifting and lowering means and a second end operatively connected to said cam member, said last mentioned means effecting movement of the second end of said lever between said cam surfaces.

12. In an automatic record player having a spindle and turntable, means for supporting a stack of records to be played and a record supporting and driving means adapted to be operatively and drivingly connected to said turntable; record lifting and lowering means, operating means for said lifting and lowering means, control means operatively connected to said operating means for adjusting the action of the latter to thereby vary the range of movement of the lifting and lowering means, said control means including a cam shaft having a plurality of cams thereon, a cam follower, means for shifting said follower into operative engagement with each of said cams, a connection means between said follower and said operating means for actuating the latter in response to movement of said follower by said cams.

13. In an automatic record player having a spindle and turntable, means for supporting a stack of records to be played and a record supporting and driving means adapted to be operatively and drivingly connected to said turntable; record lifting and lowering means, a first means operating said lifting and lowering means to effect lowering of a record from said stack to said supporting and driving means and a second means operating said lifting and lowering means to effect lifting a record from said supporting and driving means and lowering it to a turntable, said first and second means comprising a cam shaft having first and second cams thereon, a cam follower, means for shifting said follower into engagement selectively with said first and second cams, a connecting means between said follower and said lifting and lowering means.

14. In an automatic record player having a spindle and turntable, means for supporting a stack of records to be played and a record supporting and driving means adapted to be operatively and drivingly connected to said turntable; record lifting and lowering means, operating means for said lifting and lowering means, control means operatively connected to said operating means for adjusting the action of the latter to thereby vary the range of movement of the lifting and lowering means, said operating means including a cam member, a lever having a first end operatively connected to said lifting and lowering means and a second end operatively connected to said cam member, a fulcrum for said lever, said control means including means for shifting said fulcrum to vary the movement imparted by said cam member to said lever, said fulcrum shifting means including a pivotally mounted lever, said fulcrum being pivotally mounted upon said lever.

15. In an automatic record player having a spindle and turntable, means for supporting above said turntable a stack of records to be played and a record supporting and driving means adapted to be operatively and drivingly connected to said turntable; record lifting and lowering means engaging a record at a location spaced from its sound track and operable to lower a record from the bottom of said stack to said record supporting and driving means and from the latter to said turntable, a lever connected to said lifting and lowering means, a fulcrum for said lever, a cam member having a plurality of cam surfaces for imparting different movements to said lever, a movable support for said fulcrum, means for moving said support to shift the contact of said lever between said cam surfaces, means for periodically actuating said last mentioned means.

16. In an automatic record player having a spindle and turntable, means for supporting above said turntable a stack of records to be played and a record supporting and driving means adapted to be operatively and drivingly connected to said turntable; record lifting and lowering means engaging a record at a location spaced from its sound track and operable to lower a record from the bottom of said stack to said record supporting and driving means and from the latter to said turntable, a lever connected to said lifting and lowering means, a fulcrum for said lever, a cam member having a plurality of cam surfaces for imparting different movements to said lever, a movable support for said fulcrum, means for moving said support to shift the contact of said lever between said cam surfaces, means for periodically actuating said last mentioned means, said periodic actuating means comprising a plurality of control cams, a cam follower selectively engageable with said control cams, a linkage connecting said follower with said movable support.

17. The combination of claim 16 including a shaft pivoted at one end, said cam follower being slidable and rotatable upon said shaft, said linkage being directly connected to said shaft.

18. The combination of claim 17 including a shifter associated with said follower for moving the latter axially of said shaft, an adjusting cam operatively engaging said shifter for moving the latter.

19. The combination of claim 18 wherein said adjusting cam comprises a member mounted for sliding movement, stepped cam surfaces on said member.

20. In an automatic record player having a spindle and turntable, means for supporting above said turntable upon said spindle a stack of records to be played and a record supporting and driving means adapted to be operatively and drivingly connected to said turntable; record releasing, lifting, and lowering means including means engaging and supporting the underside of the bottom record in said stack and disposed in said spindle and an operating means for the same, control means operatively connected to said operating means for controlling the action of the latter to thereby vary the range of vertical movement of the record releasing, lifting and lowering means, selector means operatively associated with and controlling said control means for producing predetermined sequences of actuation by said control means.

21. The combination of claim 20 including means for manually adjusting said selector means to vary the sequence of said actuations produced by said selector means.

22. The combination of claim 20 wherein said control means includes a control cam shaft having a plurality of control cams thereon, means connecting the latter to said operating means and includes a cam follower operatively connected to said operating means, means for shifting said cam follower into operative engagement with selected control cams, an actuator operatively connected to said selector means and to said shifting means.

23. The combination of claim 20 wherein said control means includes a control cam shaft having a plurality of control cams thereon, means connecting the latter to said operating means and includes a cam follower operatively connected to said operating means, means for shifting said cam follower into operative engagement with selected control cams, an actuator operatively connected to said selector means and to said shifting means, said actuator comprising a wedge having sliding engagement with said shifting means.

24. The combination of claim 20 wherein said control means includes a control cam shaft having a plurality of control cams thereon, means connecting the latter to said operating means and includes a cam follower operatively connected to said operating means, means for shifting said cam follower into operative engagement with selected control cams, an actuator operatively connected to said selector means and to said shifting means, said selector means including a selector shaft and a plurality of selector cams thereon, means for shifting said selector shaft to effect operative engagement between one of said selector cams and said actuator.

25. The combination of claim 2 wherein said control means includes a cam shaft having a plurality of cams thereon, a cam follower, means for shifting said follower into operative engagement with each of said cams selectively, a connecting means between said follower and said operating means for actuating the latter in response to movement of said follower by said cams, said adjuster comprising a cam engaging said shifting means.

26. In an automatic record player, means for supporting and playing a record upon either side thereof in various sequences in two vertically spaced positions, a stack of records disposed above both of said spaced positions, lifting and lowering means for moving a record between said stack and the lowermost of said spaced positions, operating means for actuating said lifting and lowering means, control means operatively connected to said operating means for varying the range of movement of said lifting and lowering means whereby to selectively position a record at either of said playing positions, an adjuster operably connected to said control means and causing predetermined sequences of actuation of said control means whereby to impart the necessary succession of movements to said lifting and lowering means and thereby effect the movement of records from the stack to said lowermost position in a selected manner and the playing of said records during said movement in a selected sequence.

27. The combination of claim 26 wherein said operating means comprises a plurality of cams operable to impart different ranges of movement to said lifting and lowering means, a lift lever operatively connected to said lifting and lowering means, a fulcrum for said lift lever, a cam follower on said lift lever operably engaging one of said cams, said control means being operably connected to said fulcrum for displeasing the latter and shifting thereby said follower to a selected cam.

28. The combination of claim 27 wherein control means including a lever connected to said fulcrum, means connected to said last mentioned lever and connected to said adjuster for actuation by the latter.

References Cited in the file of this patent
UNITED STATES PATENTS

| | | |
|---|---|---|
| 2,512,701 | Weaver | June 27, 1950 |
| 2,523,157 | Somma | Sept. 19, 1950 |
| 2,544,230 | Johnson | Mar. 6, 1951 |
| 2,555,895 | Lynch | June 5, 1951 |
| 2,626,157 | Jablonski | Jan. 20, 1953 |
| 2,648,541 | Burt | Aug. 11, 1953 |
| 2,665,917 | Hoffmann et al. | Jan. 12, 1954 |
| 2,777,699 | Woodruff | Jan. 15, 1957 |

FOREIGN PATENTS

| | | |
|---|---|---|
| 377,173 | Great Britain | Jan. 16, 1931 |